P. BAYER.
BEARING ROLLER RETAINER.
APPLICATION FILED NOV. 11, 1912.
1,060,579.
Patented May 6, 1913.
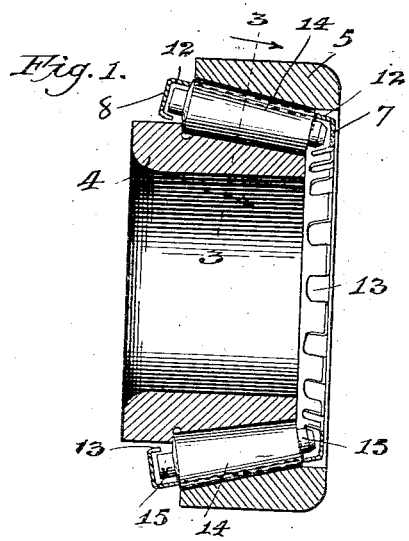
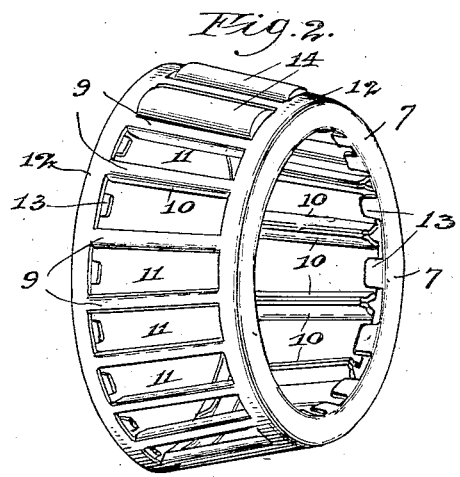
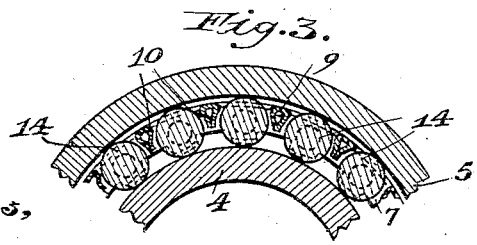
Witnesses,
Inventor,
Paul Bayer.
By Offield, Towle, Graves & Offield
Attys.

UNITED STATES PATENT OFFICE.

PAUL BAYER, OF KENOSHA, WISCONSIN, ASSIGNOR TO THE THOMAS B. JEFFERY COMPANY, OF KENOSHA, WISCONSIN, A CORPORATION OF WISCONSIN.

BEARING-ROLLER RETAINER.

1,060,579.   Specification of Letters Patent.   Patented May 6, 1913.

Application filed November 11, 1912. Serial No. 730,570.

*To all whom it may concern:*

Be it known that I, PAUL BAYER, a citizen of the United States, residing in the city of Kenosha, county of Kenosha, State of Wisconsin, have invented certain new and useful Improvements in Bearing-Roller Retainers, of which the following is a specification.

My invention relates primarily to a retainer for bearing rollers whereby the rollers may be held in fixed relation to facilitate the assembling or dis-assembling of the parts of the bearing and for the purpose of repairing or cleaning.

Generally speaking, the ordinary type of bearing roller consists of four parts, namely, an inner bearing race surface, an outer bearing race surface, bearing rollers to be placed between said surfaces and a retainer or cage in which the bearings are mounted. A retainer of this character performs several functions. It holds a plurality of bearing rollers in fixed relation so that all of the bearings may be simultaneously placed between the race surfaces or removed therefrom. In the event that it is desired to clean the roller, all of the bearing rollers may be simultaneously removed from between the race surfaces and cleaned, or in the event that a bearing roller is broken, cracked or otherwise injured an individual bearing roller may be removed from the retainer without disturbing the remaining bearing rollers. The retainer also serves the further function of holding the roller bearings in spaced relation between the race surfaces.

The particular object of the invention hereinafter more fully described consists in providing a retainer which shall be sufficiently strong to maintain the bearing rollers in fixed relation and having suitable means for locking the bearing rollers within the retainer or permitting their removal therefrom.

In the accompanying drawing, Fig. is a cross section of my improved retainer carrying bearing rollers and positioned between complementary race surfaces. Fig. 2 is a perspective view of my improved retainer; Fig. 3 is a section on the line 3—3 of Fig. 1, parts being broken away and other parts in section.

Referring now more specifically to the drawing the bearing as an entirety consists of an inner race member 4 and an outer race member 5 which are provided with complementary race surfaces to receive the bearing rollers therebetween.

The retainer is in the form of a conical metal shell having inturned annular flanges 7 and 8 formed at its ends. The body of the shell is so cut away as to leave integral ribs 9, each rib having flanges 10 formed integral therewith which are bent inwardly so as to provide bearing openings 11 between adjacent ribs 9. The openings terminate short of each end of the retainer so as to leave sections of metal 12 between the ends of the bearing openings and the inturned flanges 7 and 8. Upon the flanges 7 and 8 and preferably disposed centrally of the openings 11 a plurality of fingers 13 are formed integral with the flanges 7 and 8 which may be bent to lie either in the plane of the flanges 7 and 8 or at an angle thereto. The bearing rollers 14 are of the usual conical form and each bearing is provided with spindles 15 at each end thereof and axially disposed. The bearing rollers are of less length than the long axis of the openings 11 and are less in width than the widths of the margins between the flanges 10, but the spindles upon the bearing rollers are of sufficient length to overlie the surfaces 12. It will be readily seen that when a bearing roller is placed within one of the openings 11 with the spindles positioned between the flanges 7 and 8, that outward movement of the bearing roller relative to the retainer is prevented by the spindles coming in contact with the surfaces 12. Circumferential movement of each bearing roller relative to the retainer is prevented by the ribs 9 and flanges 10. With the fingers 13 lying in substantially the same plane as the flanges 7 and 8 it is obvious that a bearing roller might be moved from the openings 11. Therefore, to prevent any bearing roller from dropping out of the retainer after the bearings are assembled within the retainer, the fingers 13 are bent inwardly and overlie the ends of the spindles 15 thereby confining the bearing rollers within the retainer and yet permitting the free rotation thereof. It will be readily seen that by first assembling the bearing rollers within the retainer and bending over the fingers 13 that all of the bearing rollers are thereby carried as a unit and may be so placed between the race surfaces 4 and 5, or removed from between said surfaces for the purpose of cleaning or repair.

In the event that it is desired to replace one of the bearing rollers the opposite fingers overlying the spindles 15 of a single bearing may be bent into such position as will permit the spindles of the bearing desired to be removed to pass clear between said fingers, whereupon a new roller bearing may be inserted and the fingers then bent back into confining position.

Having now described my invention, I claim:

An integral pressed metal retainer for bearing rollers comprising a conical shell having inturned annular flanges at its ends, a plurality of ribs suitably spaced apart and forming bearing openings between adjacent ribs, said ribs terminating short of said annular flanges, bearing rollers between said flanges provided with a spindle at each end and fingers formed integral with said flanges and overlying the ends of said spindles.

As evidence that I claim the foregoing as my invention I have signed the same this 8th day of November, 1912, in the presence of two witnesses.

PAUL BAYER.

Witnesses:
F. R. KELLY,
FREDERICK TAYLOR.